United States Patent
Llamas et al.

(10) Patent No.: US 12,023,776 B2
(45) Date of Patent: Jul. 2, 2024

(54) DEBURRING EQUIPMENT FOR BLANK PILE

(71) Applicant: Ford Motor Company, Dearborn, MI (US)

(72) Inventors: Adrian Llamas, Hermosillo (MX); Jesus Alejandro Grageda Miranda, Hermosillo (MX)

(73) Assignee: Ford Motor Company, Dearborn, MI (US)

( * ) Notice: Subject to any disclaimer, the term of this patent is extended or adjusted under 35 U.S.C. 154(b) by 1322 days.

(21) Appl. No.: 16/369,507

(22) Filed: Mar. 29, 2019

(65) Prior Publication Data

US 2020/0306918 A1    Oct. 1, 2020

(51) Int. Cl.
*B24B 29/00*     (2006.01)
*B23Q 11/00*     (2006.01)
*B24B 27/033*    (2006.01)

(52) U.S. Cl.
CPC ........ *B24B 29/005* (2013.01); *B23Q 11/0046* (2013.01); *B24B 27/033* (2013.01)

(58) Field of Classification Search
CPC ..... B24B 9/04; B24B 27/015; B24B 27/0076; B24B 29/005; B24B 41/02; B24B 41/042; B24B 41/002; B24B 55/06; B25J 11/006; B21D 19/005; B21D 19/04
USPC .................................................. 451/236, 451
See application file for complete search history.

(56) References Cited

U.S. PATENT DOCUMENTS

| | | | |
|---|---|---|---|
| 1,022,834 A | | 4/1912 | Estell |
| 2,073,400 A | * | 3/1937 | Cumming ........... B24B 27/0015 451/280 |
| 3,823,455 A | * | 7/1974 | McIlrath ................. E01B 31/17 451/236 |
| 4,327,466 A | | 5/1982 | Yanagida et al. |
| 4,615,146 A | * | 10/1986 | Tassoni ..................... B08B 1/02 451/184 |

(Continued)

FOREIGN PATENT DOCUMENTS

| | | |
|---|---|---|
| CN | 203449087 | 2/2014 |
| CN | 203875708 | 10/2014 |

(Continued)

OTHER PUBLICATIONS

Gao, CN-107891327-A machine translation, Apr. 10, 2018 (Year: 2018).*

*Primary Examiner* — Brian D Keller
*Assistant Examiner* — Marcel T Dion
(74) *Attorney, Agent, or Firm* — Burris Law, PLLC

(57) ABSTRACT

A device for deburring edges of a pile of metal blanks includes a first roller, a second roller, at least one motor, and a main body. The first roller is supported for rotation about a first axis. The second roller is supported for rotation about a second axis. The at least one motor is drivingly coupled to the first and second rollers to rotate the first roller in a first rotational direction and the second roller in a second rotational direction that is opposite the first rotational direction. The main body supports the first roller, the second roller, and the at least one motor. The main body is movable about a periphery of the pile of metal blanks and is configured to permit contact between the first and second rollers and the edges of the pile of metal blanks.

20 Claims, 6 Drawing Sheets

(56) References Cited

U.S. PATENT DOCUMENTS

| | | | | |
|---|---|---|---|---|
| 5,947,806 | A * | 9/1999 | Rhoads | B24B 9/04 |
| | | | | 451/178 |
| 6,321,431 | B1 * | 11/2001 | Ziemek | B21C 43/04 |
| | | | | 29/81.17 |
| 6,712,061 | B1 * | 3/2004 | Kalb | B23D 47/02 |
| | | | | 125/35 |
| 8,777,698 | B2 * | 7/2014 | O'Shannessy | B24B 55/102 |
| | | | | 451/457 |
| 9,289,872 | B1 * | 3/2016 | Altamirano | B24B 9/06 |
| 2013/0216322 | A1 * | 8/2013 | Engrand | B23B 11/00 |
| | | | | 29/889.22 |
| 2014/0094092 | A1 * | 4/2014 | Thomas | B24B 27/0015 |
| | | | | 451/11 |
| 2018/0043493 | A1 * | 2/2018 | Miller, II | B24B 7/17 |
| 2018/0057399 | A1 * | 3/2018 | Harada | C03C 21/00 |

FOREIGN PATENT DOCUMENTS

| | | |
|---|---|---|
| CN | 203887652 | 10/2014 |
| CN | 204209521 | 3/2015 |
| CN | 104493659 | 4/2015 |
| CN | 204353912 | 5/2015 |
| CN | 204487310 | 7/2015 |
| CN | 105598775 | 5/2016 |
| CN | 105773336 | 7/2016 |
| CN | 205765436 | 12/2016 |
| CN | 104339236 | 2/2017 |
| CN | 207013632 | 2/2018 |
| CN | 107891327 A * | 4/2018 |
| CN | 207289679 | 5/2018 |
| JP | 4846417 | 12/2011 |

* cited by examiner

DEBURRING EQUIPMENT FOR BLANK PILE

FIELD

The present disclosure relates to deburring equipment and methods, and more specifically for deburring sheet metal blanks.

BACKGROUND

The statements in this section merely provide background information related to the present disclosure and may not constitute prior art.

The manufacture of vehicles can include forming sheet metal into body panels. This process typically includes cutting the sheet metal into two-dimensional blanks that are then stamped into three-dimensional body panels. The process of cutting the sheet metal into blanks can result in burrs along the edges of the blanks. These burrs can become contaminates during the stamping process that can cause defects in final stamped part. Such defects can result in parts being scrapped or reworked, increasing the overall cost of manufacture.

The present disclosure addresses these issues associated with burrs contaminating stamped sheet metal panels.

SUMMARY

This section provides a general summary of the disclosure and is not a comprehensive disclosure of its full scope or all of its features.

In one form, a device for deburring edges of a pile of metal blanks includes a first roller, a second roller, at least one motor, and a main body. The first roller is supported for rotation about a first axis. The second roller is supported for rotation about a second axis. The at least one motor is drivingly coupled to the first and second rollers to rotate the first roller in a first rotational direction and the second roller in a second rotational direction that is opposite the first rotational direction. The main body supports the first roller, the second roller, and the at least one motor. The main body is movable about a periphery of the pile of metal blanks and is configured to permit contact between the first and second rollers and the edges of the pile of metal blanks. In a variety of alternate forms of the present disclosure: the first roller is a cylindrical brush having bristles that extend radially outward relative to the first axis and the second roller is a cylindrical brush having bristles that extend radially outward relative to the second axis; the cylindrical brushes include a plurality of steel bristles; the device further includes a vacuum, the vacuum including a vacuum inlet supported by the support structure, the vacuum inlet being positioned proximate to the first and second rollers; the vacuum inlet is positioned between the first and second rollers; the device further includes an assisted lift arm supporting the main body; the device further includes a balancer pivotably coupling the first and second rollers to the main body, the balancer configured to permit the first and second rollers to pivot relative to the main body about a balancing axis that is transverse to the first and second axes; the balancer includes a biasing member that biases the balancer to a default position relative to the main body; the first and second rollers have an axial length equal to or greater than a height of the pile of metal blanks; the device further including a first handle and a second handle, the first and second handles being coupled to the main body; the first handle includes a first switch and the second handle includes a second switch, wherein both the first switch and the second switch must be maintained in respective on positions to supply rotary power from the at least one motor to the rollers; the device further including a third handle coupled to the main body, the third handle including a height switch, wherein activation of the height switch moves the main body vertically up or down relative to the pile; the device further including a shield, the shield coupled to the main body and extending about three sides of the main body to surround the at least one motor; the at least one motor includes a pneumatic motor; the at least one motor is either: a) a single motor drivingly coupled to both the first roller and the second roller; or b) a first motor drivingly coupled to the first roller and a second motor drivingly coupled to the second roller.

In another form, a method of deburring sheet metal blanks includes stacking a plurality of sheet metal blanks so that edges of the blanks form a perimeter of a pile of blanks, rotating a first brush about a first axis and a second brush about a second axis, the first and second brushes being supported by a movable support structure, and moving the support structure along the perimeter of the pile so that the first and second brushes contact the perimeter to remove burrs from the perimeter. In a variety of alternate forms of the present disclosure: the first and second brushes are rotated in opposite rotational directions; bristles of the first and second brushes that contact the perimeter rotate toward each other; the method further includes operating a vacuum having an inlet mounted to the support structure and configured to vacuum ejected burrs; the method further includes activating a first switch located on a first handle and activating a second switch while the first switch is activated, the second switch being located on a second handle, wherein concurrent activation of the first and second switches provides power to a motor to rotate the first and second brushes.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
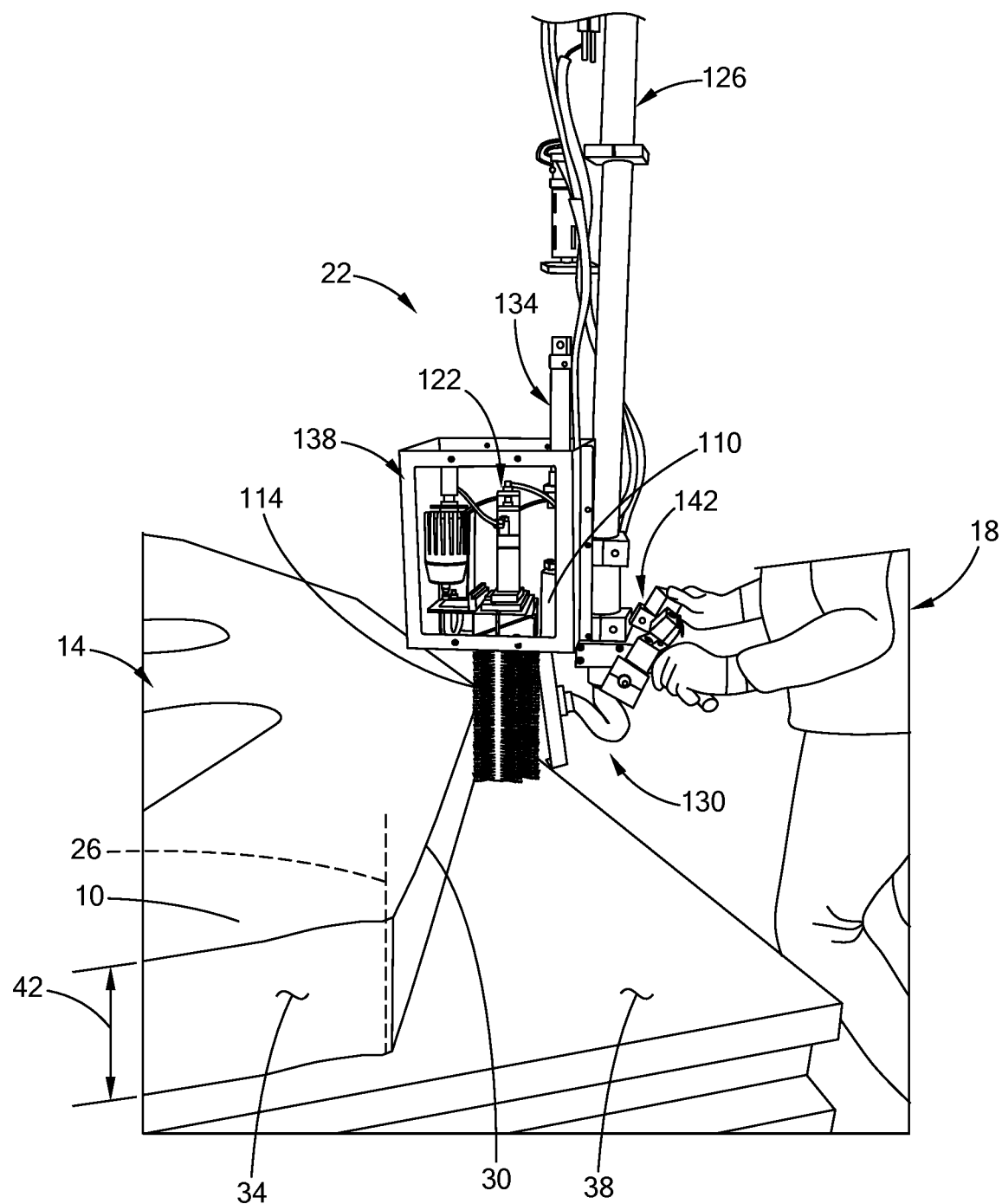
FIG. 1 is perspective view of a portion of a deburring device in accordance with the teachings of the present disclosure, illustrating a portion of an example blank pile and an operator.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features. Examples are provided to fully convey the scope of the disclosure to those who are skilled in the art. Numerous specific details are set forth such as types of specific components, devices, and methods, to provide a thorough understanding of variations of the present disclosure. It will be apparent to those skilled in the art that specific details need not be employed and that the examples provided herein, may include alternative embodiments and are not intended to limit the scope of the disclosure. In some examples, well-known processes, well-known device structures, and well-known technologies are not described in detail.

Referring to FIG. 1, a plurality of sheet metal blanks 10 are stacked in a pile 14 and an operator 18 is illustrated operating a deburring device 22. Each blank 10 is a flat piece of metal that has been cut into a two-dimensional shape in preparation for stamping into a three-dimensional shape for use on a vehicle (e.g., as a vehicle exterior body panel). The blanks 10 are stacked in the pile 14 that extends generally along a pile axis 26 so that perimeter edges 30 of the blanks 10 are roughly aligned. The cutting process can be done in any suitable manner and can result in the edges 30 being rough and/or having burrs attached thereto. The process of stacking the blanks 10 into the pile 14 and/or moving the pile can also result in the edges 30 not being perfectly aligned. Regardless of minor imperfect alignment, the edges 30 can be considered as cooperating to define a perimeter edge or perimeter face 34 of the pile 14. Due to the imperfect alignment, the perimeter face 34 can sometimes be at an angle other than 90° relative to a surface 38 upon which the pile 14 is situated (e.g., the ground or a platform). The face 34 of the pile 14 has a height 42 that is the sum of the thicknesses of the blanks within the pile 14.

Figure 3:
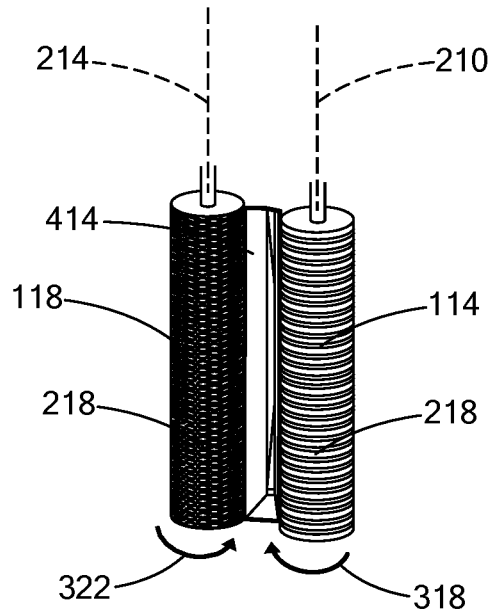
FIG. 3 is a perspective view of a pair of rollers and an inlet of a vacuum system of the deburring device of FIG. 1.
Figure 6:
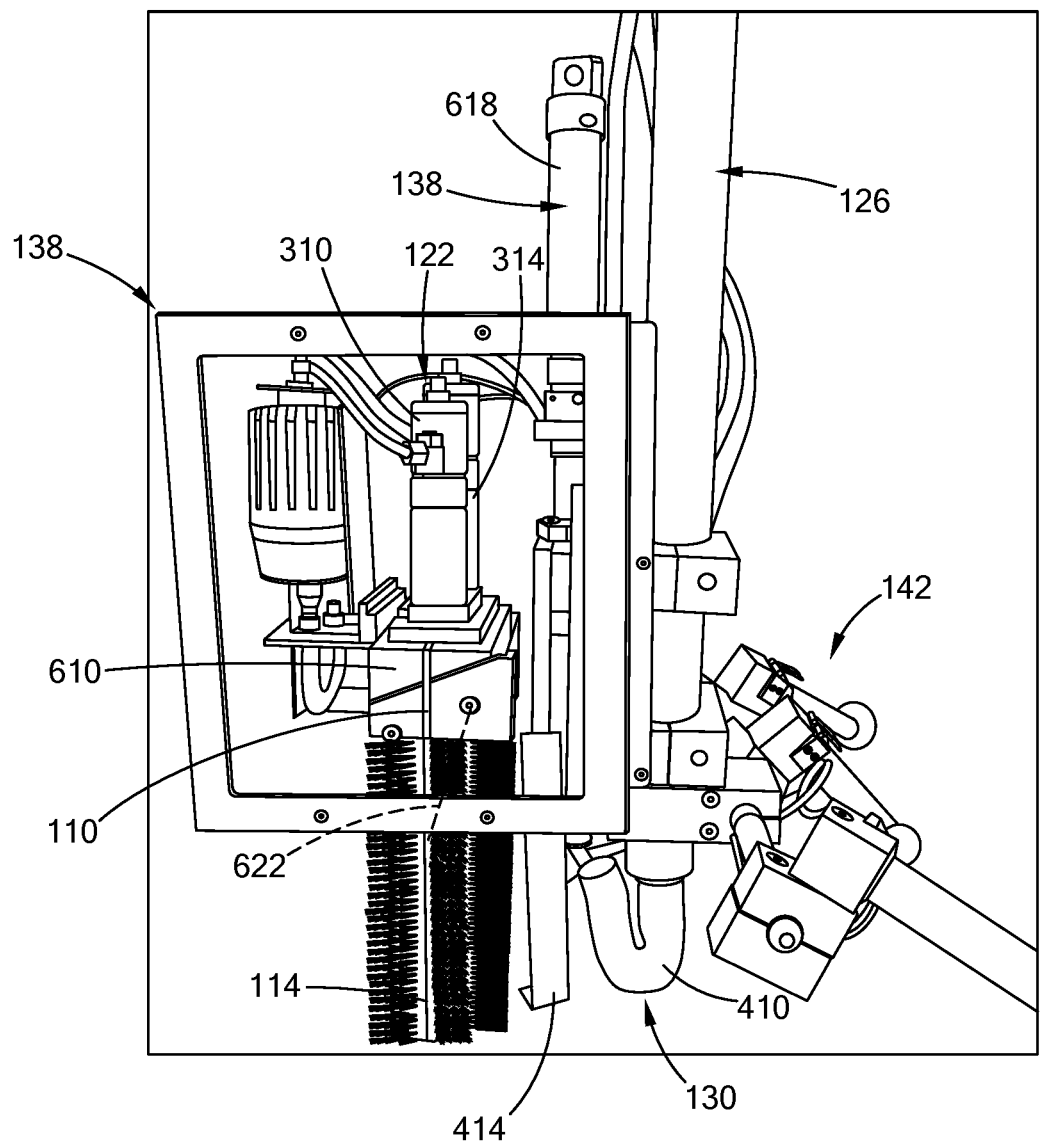
FIG. 6 is a side view of the deburring device of FIG. 1.

Referring to FIGS. 1, 3 and 6, the deburring device 22 includes a main body 110, first roller 114, a second roller 118, and a rotary drive system 122. In the example provided, the deburring device also includes a support arm 126, a vacuum system 130, a balancing mechanism 134, a shield 138 and a plurality of controls 142.

Figure 2:
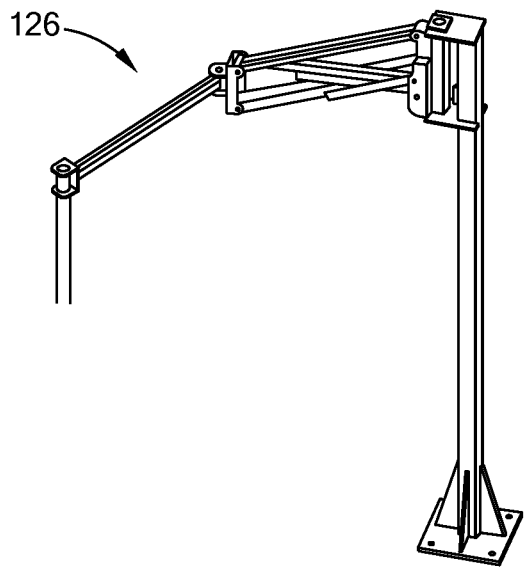
FIG. 2 is a perspective view of a support of the deburring device of FIG. 1.

The first roller 114, the second roller 118, the rotary drive system 122, a portion of the vacuum system 130, the balancing mechanism 134, the shield 138, and the controls 142 are all mounted to the main body 110 to be supported thereby for movement relative to the pile 14. The main body 110 is mounted to the support arm 126. Referring to FIG. 2, the support arm 126 is a type of arm known as a zero-gravity arm or an assisted lift arm, such that the operator 18 can move the main body 110 in three-dimensions without needing to lift the entire weight of the main body 110 and all the components mounted thereto. In other words, the support arm 126 can balance the weight of these components.

In the example provided in FIG. 2, the support arm 126 has a base mounted to the floor, though the support arm 126 can be mounted in another location, such as being ceiling or gantry mounted for example. In another example, not shown, the controls 142 can be omitted and the support arm 126 can be a robotic arm that replaces the operator 18 and automatically moves the main body 110 according to a program.

Figure 4:
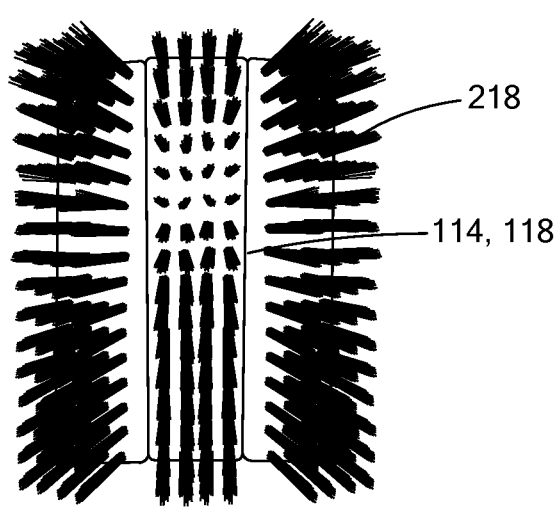
FIG. 4 is a front view of an example brush used for the rollers in the deburring device of FIG. 1.

Referring to FIGS. 3, 4, and 6, the first roller 114 is supported by the main body 110 for rotation about a first axis 210 and the second roller 118 is supported by the main body 110 for rotation about a second axis 214. The first and second axes 210, 214 can be parallel to each other and can be approximately parallel to the axis 26 of the pile 14. The first and second rollers 114, 118 can be constructed as cylindrical wire brushes having metal wire (e.g., steel) bristles 218 that extend radially outward from the respective first or second axis 210, 214. In the example provided, the first and second rollers 114, 118 include rows of bristles 218, the rows being spaced circumferentially apart about the respective axis 210, 214. In the example provided, the first and second axes 210, 214 are spaced apart a distance such that there is a gap between the bristles 218 of the first roller 114 and the bristles 218 of the second roller 118. The first and second rollers 114, 118 have a height (e.g., the length along the axial direction) that is equal to or greater than the height of the pile height 42. While described with reference to brushes with bristles 218, the rollers 114, 118 can be non-brush cylindrical deburring rollers, such as having an abrasive material about the cylindrical outer surface of the rollers 114, 118.

The rotary drive system 122 is drivingly coupled to the rollers 114, 118 to rotate the rollers 114, 118. In the example provided, the rotary drive system 122 includes a first motor 310 and a second motor 314. The first motor 310 is drivingly coupled to the first roller 114 to rotate the first roller 114 in a first rotational direction 318 (shown on FIG. 3). The second motor 314 is drivingly coupled to the second roller 118 to rotate the second roller in a second rotational direction 322 (shown on FIG. 3). The rotational directions 318, 322 are opposite such that when viewed from the front of the rollers 114, 118 (e.g., the side of the rollers that contacts the face 34) as shown in FIG. 3, the bristles 218 near the front are rotating toward each other and toward the gap between the rollers 114, 118.

Figure 9:
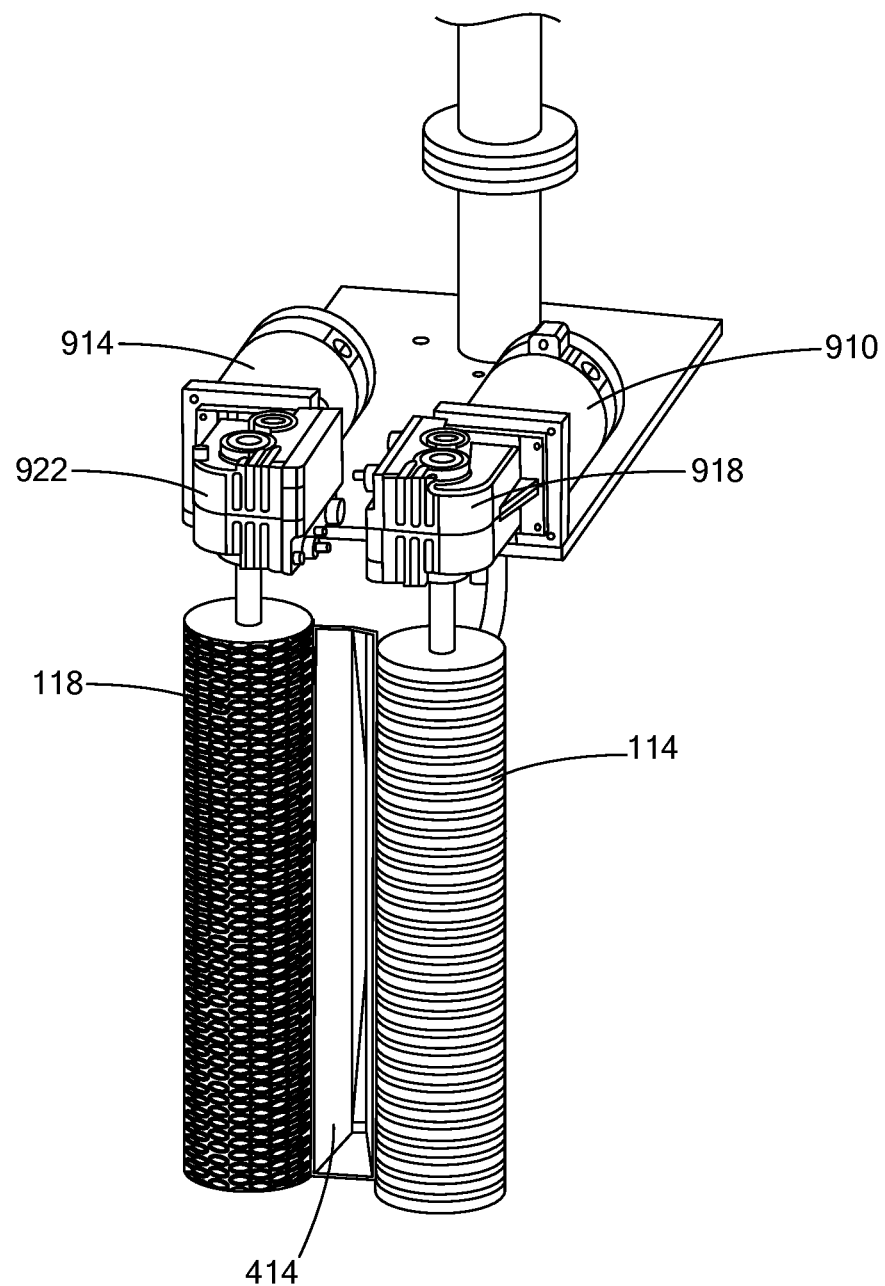
FIG. 9 is a perspective view of a portion of a deburring device of a second construction in accordance with the teachings of the present disclosure.

In the example provided, the first and second motors 310, 314 are pneumatic motors coupled to a pneumatic system (e.g., pressurized shop air; not specifically shown). The pressurized air can be generated remotely from the deburring device 22 and provided via conduits that can be mounted along the support arm 126. In an alternative construction, shown in FIG. 9, the first and second motors 310, 314 can be replaced with electric motors 910, 914. In the example provided in FIG. 9, the electric motors 910, 914 are drivingly coupled to the rollers 114, 118 via gearboxes 918, 922. In another alternative construction, not specifically shown, the motors 310, 314 or 910, 914 can be replaced with a single motor (e.g., electric or pneumatic) with gears or belts that are configured to drive both rollers 114, 118 from the single motor.

Returning to FIGS. 3 and 6, the vacuum system 130 includes a vacuum motor (not shown), a debris container (not shown), a vacuum hose 410, and a vacuum inlet 414. The vacuum motor (not shown) and debris container (not shown) can be remote from the deburring device 22 and configured such that the vacuum motor creates suction within the vacuum hose 410 to draw burrs or debris into the vacuum inlet 414 and through the vacuum hose 410 to be collected in the debris container for disposal. The vacuum inlet 414 is an elongated trough the height of the rollers 114, 118 and positioned generally between the rollers 114, 118, though the vacuum inlet 414 can be behind the axes 210, 214. The vacuum inlet 414 is open toward the front of the deburring device 22 so that the rotation of the rollers 114, 118 directs burrs or debris into the vacuum inlet 414. The vacuum hose 410 is connected to the back of the vacuum inlet 414 to provide suction to the vacuum inlet 414. The vacuum hose 410 is mounted along the support arm 126 to connect the vacuum inlet 414 to the remote debris container (not shown).

Figure 5:
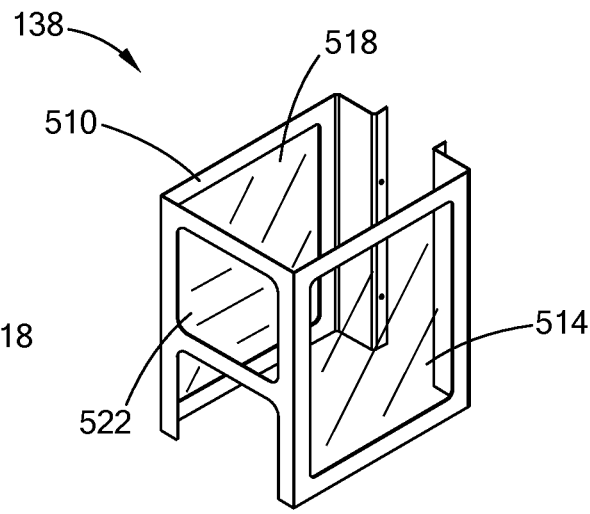
FIG. 5 is a perspective view of a shield of the deburring device of FIG. 1.

Referring to FIGS. 5 and 6, the shield 138 is mounted to the main body 110 and includes a shield frame 510 supporting shield panels. In the example provided, the shield panels are transparent polycarbonate panels and the frame supports a left panel 514, a right panel 518, and a front panel 522. In the example provided, the rear of the deburring device 22 is generally shielded by the shield frame 510, the main body 110, and/or the support arm 126. The shield panels 514, 518, 522 surround the motors 310, 314 and a portion of the main body 110, but do not surround the rollers 114, 118. In other words, the rollers 114, 118 extend below the shield 138 at least on the front and sides of the rollers 114, 118.

Figure 7:
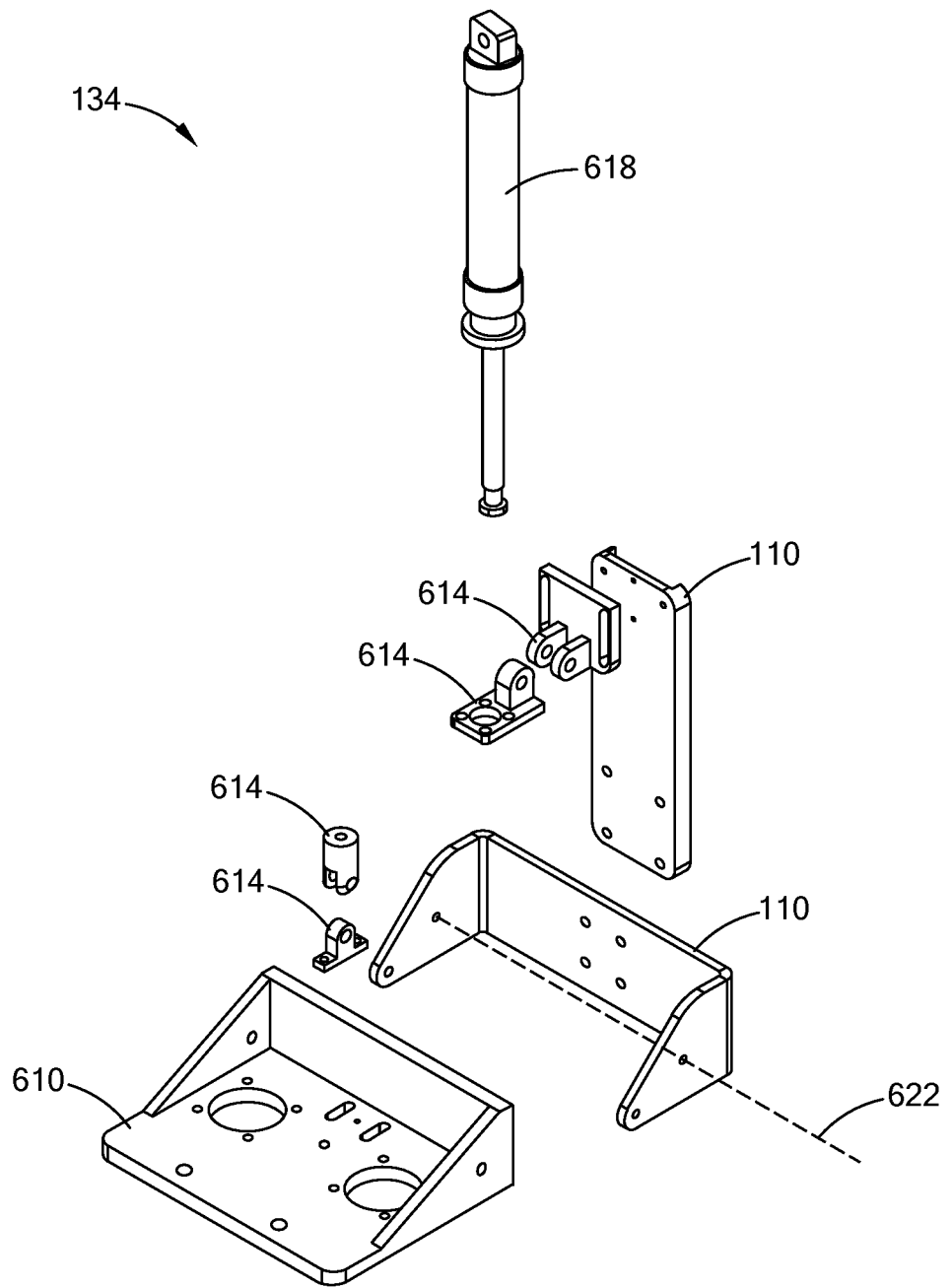
FIG. 7 is a perspective view of a balancing mechanism of the deburring device of FIG. 1.

With reference to FIGS. 6 and 7, the balancing mechanism 134 includes a mounting member 610, a pivot frame 614, and a resistance member 618. The balancing mechanism 134 is generally configured to allow the rollers 114, 118 to pivot relative to the main body 110 so that the axes 210, 214 of the rollers can match the axis 26 of the pile 14 when the axis 26 of the pile 14 is not exactly 90° relative to the ground. The motors 310, 314 and rollers 114, 118 are mounted to the mounting member 610. The mounting member 610 is coupled to the main body 110 so that the mounting member 610 can pivot about a pivot axis 622 that is transverse to the axes 210, 214. The resistance member 618 is coupled to the main body 110 and the mounting member 610 and resists pivoting of the mounting member 610 and biases the mounting member 610 to a position such that the axes 210, 214 are vertical. In the example provided, the resistance member 618 is a gas shock, though other devices can be used (e.g., a spring).

Figure 8:
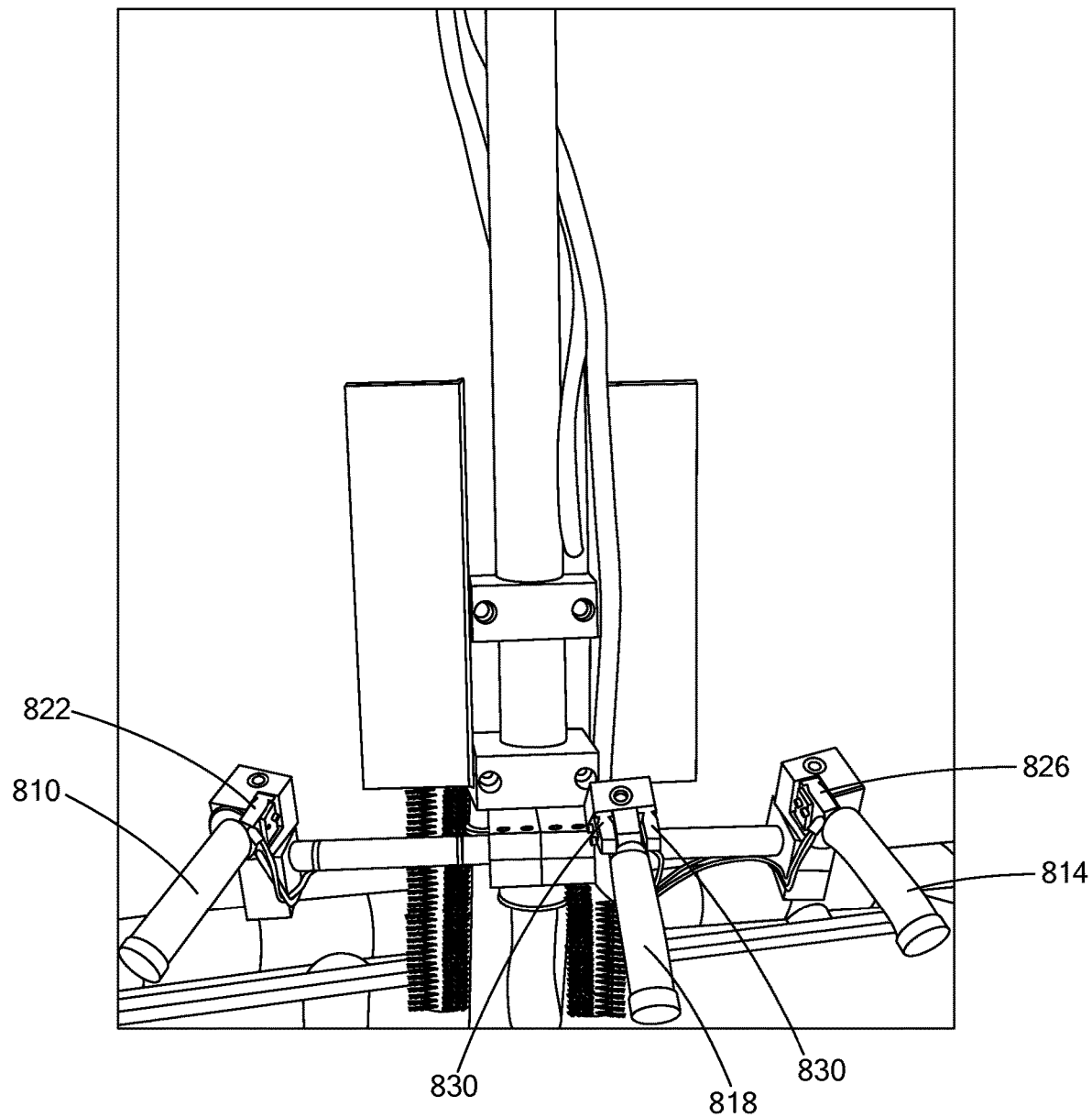
FIG. 8 is a rear view of a portion of the deburring device of FIG. 1, illustrating handle controls in accordance with the teachings of the present disclosure.

Referring to FIG. 8, the controls 142 are configured to operate the motors 310, 314 and be used to move the main body 110 relative to the pile 14. In the example provided, the controls 142 includes a first handle 810, a second handle 814, and a third handle 818. The first handle 810 has a first button 822. The second handle 814 has a second button 826. The first and second handles 810, 814 are spaced apart such that the operator 18 cannot reach both the first and second buttons 822, 826 with one hand.

The first and second buttons are coupled to the drive system 122 and configured such that the first and second motors 310, 314 only operated while both the first and second buttons 822, 826 remain pressed. Thus, the operator 18 must have both hands on the controls 142 in order for the rollers 114, 118 to rotate. The first and second buttons 822, 826 can also be coupled to the vacuum system 130 such that the vacuum system 130 is activated to provide suction to the vacuum inlet 414 when both the first and second buttons 822, 826 are pressed. While buttons are described herein, other input devices (e.g., switches, contact sensors, pressure sensors) can also be used.

The third handle includes at least one third button 830 configured to control the height of the main body 110 up and/or down relative to the pile 14. Thus, in the example provided, the operator 18 can only move the rollers 114, 118 horizontally along the perimeter of the pile 14 and cannot move the rollers 114, 118 up or down while operating the rollers 114, 118. While buttons are described herein, other input devices (e.g., switches, contact sensors, pressure sensors) can also be used.

In operation, sheet metal blanks 10 are cut to shape then stacked so that the edges 30 form a perimeter of the pile 14 (e.g., the face 34). The operator 18 then operates the third buttons 830 to position the rollers 114, 118 vertically aligned with the face 34. By releasing the third button 830 on the third handle 818, the rollers 114, 118 are locked in this vertical plane. The operator 18 then grips the first and second handles 810, 814 and activates the first and second buttons 822, 826 to rotate the rollers 114, 118 and activate the vacuum system 130. The operator 18 then moves the main body 110 until the rollers 114, 118 contact the face 34 and then moves the rollers 114, 118 along the face 34 until the entire perimeter of the pile has been polished to remove burrs.

As used herein, the phrase at least one of A, B, and C should be construed to mean a logical (A OR B OR C), using a non-exclusive logical OR, and should not be construed to mean "at least one of A, at least one of B, and at least one of C."

Unless otherwise expressly indicated, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

The terminology used herein is for the purpose of describing particular example forms only and is not intended to be limiting. The singular forms "a," "an," and "the" may be intended to include the plural forms as well, unless the context clearly indicates otherwise. The terms "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

The description of the disclosure is merely exemplary in nature and, thus, examples that do not depart from the substance of the disclosure are intended to be within the scope of the disclosure. Such examples are not to be regarded as a departure from the spirit and scope of the disclosure. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A device for deburring edges of a pile of metal blanks comprising:
   a first roller supported for rotation about a first axis, wherein the first roller is a cylinder coaxial with the first axis and having a cylindrical surface that faces radially outward relative to the first axis and includes one of a first abrasive material and a plurality of first bristles;
   a second roller supported for rotation about a second axis that is substantially parallel to the first axis, wherein the second roller is a cylinder coaxial with the second axis and having a cylindrical surface that faces radially outward relative to the second axis and includes one of a second abrasive material and a plurality of second bristles;

at least one motor drivingly coupled to the first and second rollers and configured to rotate the first roller in a first rotational direction and the second roller in a second rotational direction that is opposite the first rotational direction while the first roller is rotated in the first rotational direction;

a main body supporting the first roller, the second roller, and the at least one motor, the main body being movable about a periphery of the pile of metal blanks and configured to permit contact between the first and second rollers and the edges of the pile of metal blanks; and a balancer including a mounting member pivotably coupled to the main body to pivot relative to the main body about a balancing axis that is transverse to the first and second axes, wherein the first and second rollers are mounted to the mounting member so as to pivot with the mounting member.

2. The device according to claim 1, wherein the cylindrical surface of the first roller includes the plurality of first bristles, the plurality of first bristles extending radially outward relative to the first axis and the second roller includes the plurality of second bristles, the plurality of second bristles extending radially outward relative to the second axis.

3. The device according to claim 2, wherein the plurality of first bristles and the plurality of second bristles are steel bristles.

4. The device according to claim 1, further comprising a vacuum, the vacuum including a vacuum inlet supported by the support structure, the vacuum inlet being positioned proximate to the first and second rollers.

5. The device according to claim 4, wherein the vacuum inlet is positioned between the first and second rollers and extends longitudinally in a direction parallel to the first and second axes.

6. The device according to claim 1, further comprising an assisted lift arm supporting the main body.

7. The device according to claim 1, wherein the mounting member is configured to maintain the second axis parallel to the first axis while pivoting about the balancing axis relative to the main body.

8. The device according to claim 7, wherein the balancer includes a resistance member that biases the mounting member to a default position relative to the main body.

9. The device according to claim 1, further comprising a first handle and a second handle, the first and second handles being coupled to the main body.

10. The device according to claim 9, wherein the first handle includes a first switch and the second handle includes a second switch, wherein both the first switch and the second switch must be maintained in respective on positions to supply rotary power from the at least one motor to the rollers.

11. The device according to claim 9, further comprising a third handle coupled to the main body, the third handle including a height switch, wherein activation of the height switch moves the main body vertically up or down relative to the pile.

12. The device according to claim 1, further comprising a shield, the shield coupled to the main body and extending about three sides of the main body to surround the at least one motor.

13. The device according to claim 1, wherein the at least one motor includes a pneumatic motor.

14. The device according to claim 1, wherein the at least one motor is either:
   a) a single motor drivingly coupled to both the first roller and the second roller; or
   b) a first motor drivingly coupled to the first roller and a second motor drivingly coupled to the second roller.

15. A method of deburring sheet metal blanks comprising:
   stacking a plurality of sheet metal blanks so that edges of the blanks form a perimeter of a pile of blanks;
   rotating a first brush about a first axis and a second brush about a second axis, the first and second brushes being supported by a movable support structure, wherein the first and second brushes are mounted to a mounting member of the support structure, the mounting member being pivotably coupled to a main body of the support structure such that the mounting member is configured to pivot the first and second rollers about a balancing axis relative to the main body, the balancing axis being transverse to the first and second axes; and
   moving the support structure along the perimeter of the pile so that the first and second brushes contact a common side of the perimeter to remove burrs from the perimeter along the common side.

16. The method according to claim 15, wherein the first and second brushes have an axial length equal to or greater than a height of the pile of blanks.

17. The method according to claim 15, wherein the first and second brushes are rotated in opposite rotational directions.

18. The method according to claim 17, wherein rotation of the first and second brushes is such that bristles of the first and second brushes are rotating toward each other when those bristles are in contact with the perimeter.

19. The method according to claim 15, further comprising:
   operating a vacuum having an inlet mounted to the support structure and configured to vacuum ejected burrs.

20. The method according to claim 15, further comprising:
   activating a first switch located on a first handle; and
   activating a second switch while the first switch is activated, the second switch being located on a second handle,
   wherein concurrent activation of the first and second switches provides power to a motor to rotate the first and second brushes.

* * * * *